United States Patent [19]

Saito et al.

[11] Patent Number: 4,685,432

[45] Date of Patent: Aug. 11, 1987

[54] METHOD AND DEVICE FOR FORMING MIXTURE GAS IN DIRECT INJECTION TYPE INTERNAL COMBUSTION ENGINE

[75] Inventors: Akinori Saito; Masatoshi Yamada; Kenji Imai; Kiyomi Kawamura; Masanobu Kimura, all of Aichi, Japan

[73] Assignee: Kabushiki Kaisha Toyota Chuo Kenkyusho, Aichi, Japan

[21] Appl. No.: 666,418

[22] Filed: Oct. 30, 1984

[51] Int. Cl.⁴ ............................................. F02B 19/08
[52] U.S. Cl. ..................................... 123/276; 123/263
[58] Field of Search ............... 123/262, 263, 275, 276, 123/279

[56] References Cited

U.S. PATENT DOCUMENTS

| 4,401,071 | 8/1983 | Zurner et al. | 123/276 |
| 4,492,193 | 1/1985 | Neitz | 123/276 |
| 4,522,172 | 6/1985 | Oshima et al. | 123/276 |

FOREIGN PATENT DOCUMENTS

| 2000222 | 1/1979 | Fed. Rep. of Germany | 123/276 |
| 2928441 | 1/1981 | Fed. Rep. of Germany | 123/276 |
| 473174 | 10/1937 | United Kingdom | 123/276 |

Primary Examiner—Tony M. Argenbright
Attorney, Agent, or Firm—Sughrue, Mion, Zinn, Macpeak, and Seas

[57] ABSTRACT

A method and device for forming mixture gas for a direct fuel injection type internal combustion engine, which has a piston with a recess forming a combustion space, air intake means with swirling means for switching intake air to be supplied into the combustion chamber, and an intermittent swirl injector nozzle having at least one tangential passage for swirling fuel supplied through fuel supplying means to the combustion chamber, to jet the fuel in conical form to the swirling intake air, to form a mixture gas, and which comprises the steps of supplying swirling intake air into the combustion space, the swirling intake air having a swirl speed in conformance to the speed of the internal combustion engine, and spraying fuel from the swirl injection nozzle onto the swirling intake air in the combustion space at a fuel spray angle varied in response to the engine speed, thereby controlling the spray travel distance of the fuel and allowing the fuel to float in the combustion space without being stuck onto a wall of the combustion space under a wide range of operating conditions of the engine.

16 Claims, 36 Drawing Figures

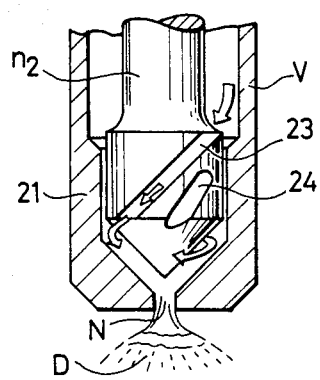
FIG. 13
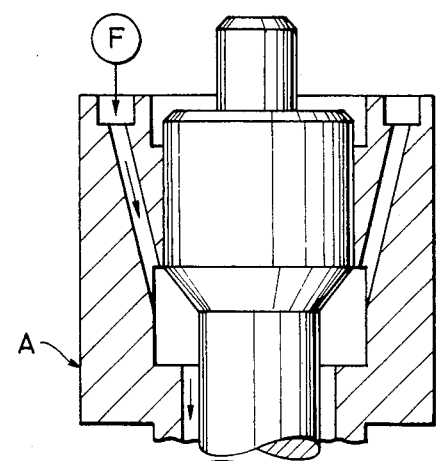
FIG. 14
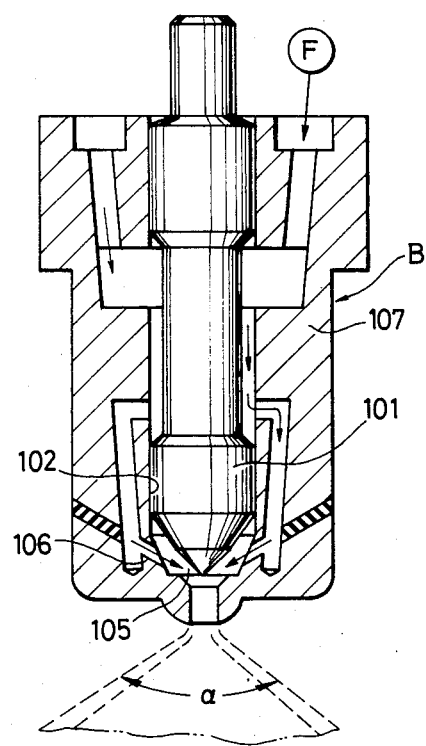
FIG. 15
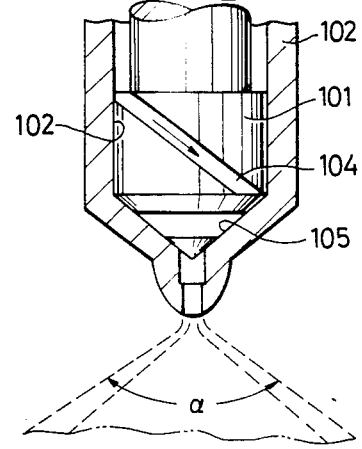

4,685,432

METHOD AND DEVICE FOR FORMING MIXTURE GAS IN DIRECT INJECTION TYPE INTERNAL COMBUSTION ENGINE

BACKGROUND OF THE INVENTION

1. Field of the Invention

This invention relates to a method of forming a mixture gas in a direct injection type internal combustion engine, and a device for practicing the method.

2. Description of the Prior Art

A so-called "M-combustion system" has been known as a combustion system for a direct injection type diesel engine. In the system, fuel spray jetted by a fuel injection nozzle is positively caused to stick onto the wall of the combustion chamber, so that it is evaporated by the heat of the wall so as to form a mixture gas. In this case, the relationships between the time and the wall temperature which are required for evaporating the fuel on the wall are as indicated in FIG. 1. As is apparent from FIG. 1, the range of temperatures in which fuel is evaporated in a short time conforming to the combustion time (below 10 msec) in the engine is around 320° C. On the other hand, under the ordinary operating conditions, the surface temperature of the piston is 200° to 250° C. at most. Therefore, it can be estimated that a period of time required for evaporating the fuel by the heat of the wall of the combustion chamber is relatively long.

Accordingly, in the M-combustion system, which is a typical example of the conventional combustion system, at the start of the engine or during the low speed operation of the engine the mixture gas is not satisfactorily formed. As a result, the combustion is unsatisfactory, the engine output is low, and the efficiency is also low. Furthermore, a lot of harmful exhaust gas containing for instance black smoke and HC is generated.

On the other hand, the recent tendency of an internal combustion engine for automobile is that its size is decreased (to decrease the quantity of exhaust gas) and the speed is increased. Accordingly, it has been required to improve the fuel injection system. That is, in order to maintain the best performance of the engine at all times under a wide range of operating conditions such as various engine speed and load conditions, it is essential to use a fuel injection system which can satisfactorily operate under all the operating conditions.

For instance, a fuel injection system for diesel engine essentially comprises an injection pump, an injection pipe, and a fuel injection nozzle. It is well known in the art that the spray characteristic of the fuel injection nozzle directly affects the performance of the engine.

For instance, in a conventional direct injection type internal combustion engine, the fuel injection nozzle is arranged substantially at the center of a recess which is formed in the top of the piston, so that a plurality of fuel sprays are jetted from the plurality of injection holes of the nozzle, respectively. The intake air swirl which is formed by the suction valve and the intake passage in the stroke of suction still remains at the end of the stroke of compression, thus flowing the fuel sprays in the direction of the swirl to form a mixture gas. The diameter of the aforementioned recess is, in general, 40 to 70% of the diameter of the piston or cylinder. Accordingly, in a small engine in which the diameter of the piston is below 100 mm, the diameter of the recess is necessarily small. If it is required to increase the ratio of compression, the diameter of the recess is further decreased. Accordingly, the fuel sprays jetted radially from the plurality of injection holes of the nozzle strike against the wall of the recess, thus remaining as liquid-state films or large droplets on the wall. Therefore, the fuel sprays thus jetted are not effectively burnt. As a result, the amount of mixture gas effective for combustion is decreased, the engine output is decreased, the fuel consumption is increased, and harmful smoke is generated.

A swirl injection nozzle, which is one of the fuel injection nozzles proposed by the inventors, has been applied to a direct injection type internal combustion engine, to confirm its usefulness. In this connection, it has been found that, in order to obtain the best performance of the engine by forming a desired mixture gas under a wide range of operating conditions, it is necessary to change the spray characteristic of the injection nozzle in conformance to the operating conditions. That is, it is necessary to develop swirl injection nozzles whose spray characteristics are determined according to the operating conditions.

There are available three different intermittent type swirl injection nozzles A, B and C. In the swirl injection nozzle A, as shown in FIG. 14, a tangential passage, namely a tangential groove 104 is formed in the outer wall of the needle valve 101. In the swirl injection nozzle B, as shown in FIG. 15, tangential ports 106 are communicated tangentially with a swirl chamber 105. In the swirl injection nozzle C, as shown in FIG. 16, a cylindrical partition member 109 is inserted into the nozzle body 107 in such a manner that it is in contact with the needle valve 101 and the inner wall 108 of the nozzle body 107, and tangential grooves 100 are formed in the outer wall of the partition member 109.

In each of the swirl injection nozzles A, B and C, the fuel is swirled by the tangential grooves or ports, and is atomized into fine droplets when jetted from the injection hole, thus forming a fuel spray. These injection nozzles A, B and C are large in spray angle and excellent in atomizing characteristic, and accordingly short in spray travel distance (or small in spray penetration), when compared with other fuel injection nozzles such as hole injection nozzles and throttle injection nozzles.

The conventioanl swirl injection nozzle has too large a spray angle as described above. Therefore, although the spray will not strike against the wall of the combustion chamber, the fuel droplets are held at rest in the combustion chamber.

If the fuel droplets are held at rest in the combustion chamber as described above, then they are surrounded by the combustion gas, as a result of which the combustion will not progress. That is, it is necessary that the fuel drops can proceed in the combustion chamber until the combustion is ended. Accordingly, a swirl injection nozzle for a direct injection type internal combustion engine should be one which can spray fuel satisfactorily in conformance with the operating conditions of the internal combustion engine. However, a method of designing or manufacturing such a swirl injection nozzle has not been proposed yet.

In each of the above-described intermittent type swirl injection nozzles A, B and C, the needle valve is slidably fitted in the valve hole formed in the valve body. Therefore, there must be a predetermined gap between the needle valve and the wall of the valve hole. Heretofore, in order to prevent the leakage of high pressure fuel from the gap, the gap is set to an extremely small value, about 2 to 5 μm, or a swirl injection nozzle designing or manufacturing method utilizing a hydrodynamic means is employed. However, it is difficult to form the gap with high and uniform accuracy.

The spray angle of each of the intermittent type swirl injection nozzles A, B and C is large, as was described before. Therefore, the fuel droplets may stick onto the wall of the combustion chamber in the internal combustion engine. In order to prevent this difficulty, the spray angle should be set to a value which is suitable for the configuration or dimension of the combustion chamber. However, the spray angle of the conventional intermittent type swirl injection nozzle cannot readily be changed to a desired value.

Where a fuel resistance is represented by a flow rate coefficient C, and a spray configuration by a spray angle α, the characteristic of the swirl injection nozzle A, B or C is affected by the factors of the tangential passage in the nozzle. It has been found that the diameter of the injection hole, the area of the tangential passage, the angle between the center line of the tangential passages and the central axis of the needle valve, and the gap between the tangential passage of the needle valve and the wall of the valve hole greatly affect the characteristic of the swirl injection nozzle. The effects of the area of the tangential passage and the gap between the tangential passage of the needle valve and the wall of the valve hole are as indicated in FIG. 17. As is apparent from FIG. 17, of these factors the aforementioned gap greatly affects the spray angle.

In this connection, the inventors have performed several experiments and analyses to improve the gap, the spray angle and the injection hole of the conventional swirl injection nozzle, thereby to obtain a spray characteristic which is in conformance with the operating condition of the internal combustion engine.

Heretofore, the gap is designed merely to prevent the leakage of fuel. On the other hand, the inventors has considered that the gap should be designed as an essential factor to determine the performance of the swirl injection nozzle. That is, in order to allow the swirl injection nozzle to have the most desirable characteristic factors, such as the aforementioned spray angle, flow rate coefficient and travel distance, which are suitable for the operating conditions of the internal combustion engine, the inventors have established an epoch making method which effectively utilizes the aforementioned gap, and proposes an intermittent type swirl injection nozzle as a mixture gas forming device, which can perform novel functions.

SUMMARY OF THE INVENTION

Accordingly, an object of this invention is to provide a mixture gas forming method for a direct injection type internal combustion engine in which the fuel spray is not stuck onto the wall of the combustion chamber, and it is allowed to float in the intake air in the combustion chamber, which has been subjected to adiabatic compression to have a high temperature (usually higher than 600° C.), to form an excellent mixture, so that the combustion efficiency is improved, and a device for practicing the method.

Another object of the invention is to provide a mixture gas forming method for a direct injection type internal combustion engine in which the characteristics of a fuel injection nozzle, such as the spray angle, the penetration force (or travel distance) of fuel spray and the injection period are controlled according to the speed of the intake air in the combustion chamber, so that under a wide range of operating conditions of the engine the fuel spray is prevented from being stuck onto the wall of the combustion chamber, whereby the combustion in good condition takes place in the high temperature air in the combustion chamber, and a device for practicing the method.

A further object of the invention is to provide a mixture gas forming method for a direct injection type internal combustion engine in which, in order to allow fuel droplets to float in the combustion chamber by controlling the fuel spray speed in conformance to the intake swirl speed, when the internal combustion engine is operated in a low speed range the fuel spray angle is made large to cause the fuel spray to travel a short distance, and when the engine is operated in a high speed range the fuel spray angle is made small to cause the fuel spray to travel a long distance, and a device for practicing the method.

A still further object of the invention is to provide an intermittent swirl injection nozzle for forming a mixture gas, which is simple in construcion, high in accuracy, excellent in atomizing characteristic, and less in pressure loss, and which can be readily manufactured and installed on the engine.

The foregoing objects and other objects as well as the characteristic features of the invention will become more apparent from the following detailed description and the appended claims when read in conjunction with the accompanying drawings.

BRIEF DESCRIPTION OF THE DRAWINGS

In the accompanying drawings:

FIG. 13 is a diagram showing a swirl injection nozzle in a second embodiment of the invention;

FIGS. 14 through 16 are diagrams showing conventional intermittent type swirl injection nozzles to which the technical concept of the invention is applicable;

DETAILED DESCRIPTION OF THE INVENTION

Figure 1:
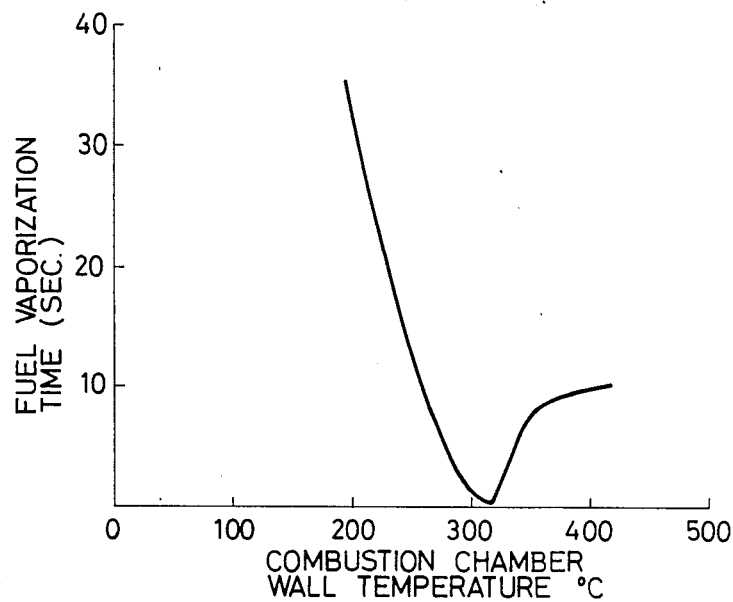
FIG. 1 is a graphical representation indicating combustion chamber surface temperatures versus fuel evaporation periods.

Provided by this invention is a mixture gas forming method for a direct fuel injection type internal combustion engine, which has a piston with a recess forming a combustion space, air intake means with swirling means for swirling intake air supplied to the combustion space, and an intermittent type swirl injection nozzle having at least one tangential passage for swirling fuel which is supplied through fuel supplying means to the combustion space, to jet fuel substantially in conical form through an injection hole thereof to the swirling intake air, to form a mixture gas; which comprises the steps of supplying swirling intake air into said combustion space, said swirling intake air having a swirl speed in conformance to the speed of said internal combustion engine, and spraying fuel from said swirl injection nozzle onto said swirling intake air in said combustion space at a fuel spray angle, defined as the angle of said conical form, varied in response to said engine speed, thereby controlling the spray travel distance of said fuel and allowing said fuel to float in said combustion space without being stuck onto a wall of said combustion space under a wide range of operating conditions of the engine.

And in the method, when the engine is operated in a low speed range, the fuel is sprayed with a relatively large fuel spray angle, so as to travel a short distance, and when it is operated in a high speed range, the fuel is sprayed with a relatively small fuel spray angle, so as to travel a long distance.

Further, in the method, the intake air swirl speed is made substantially equal to the fuel spray speed, to allow the fuel spray to float in the combustion space.

Further, in the method, when the engine is operated in the low speed range, the swirl speed of the intake air is not more than 40 m/sec, the fuel spray angle of the swirl injection nozzle is set to 20° to 75°, to allow the fuel spray to travel a relatively short distance, and when the engine is operated in the high speed range and the swirl speed of the intake air is higher than 40 m/sec, the fuel spray angle is set to 10° to 30°, to allow the fuel spray to travel a relatively long distance.

Furthermore, in the method, when the engine is operated in the low speed range, the fuel injection period of the nozzle is set to 2 to 3 msec, and when it is operated in the high speed range, the fuel injection period is set to 0.5 to 1 msec.

Further provided by the invention is a mixture gas forming device for a direct injection type internal combustion engine, which comprises: a piston with a recess forming a combustion space; air intake means having air swirling means, for supplying swirling intake air into said combustion space at a swirl speed in conformance to the speed of said internal combustion engine; and an intermittent swirl injection nozzle for spraying fuel onto said swirling intake air in said combustion space at a fuel spray angle, defined as the angle of said conical form, varied in response to said engine speed, said intermittent swirl injection nozzle comprising: a valve body having a valve hole formed therein and a bottom portion with a valve seat and an injection hole; a needle valve slidably fitted in said valve hole, for opening and closing said injection hole; at least one tangential passage for swirling fuel to be supplied to said combustion space when said needle valve is lifted; and means for changing the area of a nozzle gap between said valve body and said needle valve to change the quantity of fuel to be supplied through said nozzle gap relative to the quantity of fuel to be supplied through said tangential passage in response to said engine speed, said nozzle gap being provided in at least one of said valve hole and needle valve near said tangential passage and at a part where said needle valve is slidably fitted in said valve hole, thereby allowing said fuel to float in said combustion space without being stuck onto a wall of said combustion space under a wide range of operating conditions of the engine.

Further provided by the invention is a device in which said means for changing the area of said nozzle gap comprises means for increasing the area of said nozzle gap to make the quantity of fuel flowing through said nozzle gap larger than that flowing through said tangential passage, whereby, the fuel spray angle of said swirl injection nozzle is made large under the low speed operation to allow said fuel spray to travel a relatively short distance, the fuel spray angle of said swirl injection nozzle is made small under the high speed operation to allow said fuel spray to travel a relatively long distance.

In the intermittent type swirl injection nozzle, at least one of the valve hole and needle valve is adapted to increase or decrease the area of the nozzle gap at the part of the valve body where the needle valve is slidably fitted in the valve hole, as the needle valve is lifted.

In the mixture gas forming method of the invention, as the piston is lifted, the swirling intake air stream formed by a swirling mechanism including a suction valve and a suction port in the stroke of suction of the internal combustion engine is suitably led into the recess which is the combustion space so that it flows smoothly and stably therein.

Furthermore in the method of the invention, in order to effectively utilize the swirling intake air stream, the spray angle, penetration force and spray period of fuel spray jetted by the fuel injection nozzle are controlled so that the fuel spray is positively caused to float in the combustion space by the swirling intake air stream while being prevented from sticking onto the wall which defines the combustion space, thus forming an excellent mixture gas.

The fuel spray from the fuel injection nozzle forms the mixture gas by effectively utilizing the swirling intake air stream as described above. The fuel spray will not adversely affect the swirl of the intake air stream, and lasts until the swirl is attenuated. That is, the fuel spray lasts for a long period. Therefore, the combustion is accelerated, the combustion period is decreased, and the combustion efficiency is remarkably improved. These effects should be highly appreciated in practical use.

The mixture gas forming method of the invention may be applied to "a direct injection type engine" also the typical example of which is a small, high speed diesel engine having a cylinder diameter 100 mm or less. The conventional M-combustion method may be applied to an engine of this type; however, the application of the method is not practical because it is difficult to control the temperature of the combustion chamber wall.

On the other hand, in the method of the invention, sticking the fuel spray onto the combustion chamber wall is prevented, and the fuel spray is jetted to the intake air whose temperature is raised by the adiabatic compression of the piston, so that the combustion takes place quickly. In order to prevent the fuel spray from sticking to the combustion chamber wall, the relation between the penetration force of the fuel spray and the velocity of the swirling intake air stream acting on the fuel spray before the ignition of the fuel spray is essential. Accordingly, in the mixture gas forming method of the invention, these factors are suitably regulated and controlled.

Figure 2:
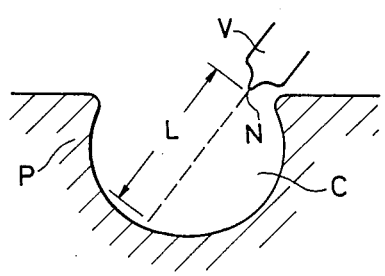
FIG. 2 is an explanatory diagram showing the positional relationship between an ordinary combustion chamber and an ordinary fuel injection nozzle.
Figure 3:
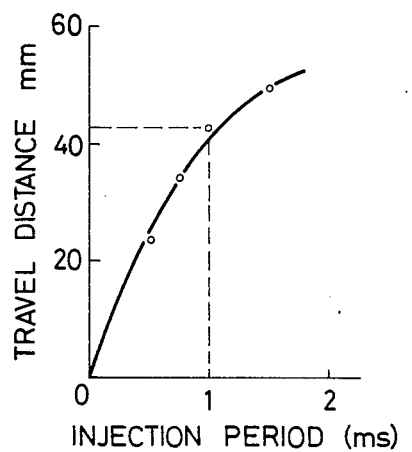
FIG. 3 is a graphical representation indicating injection periods versus travel distances for a conventional injection nozzle.
Figure 4:
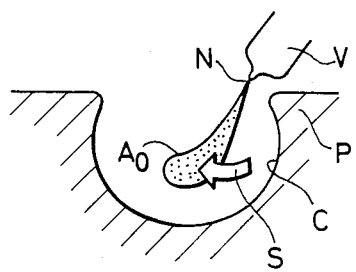
FIGS. 4 through 6 are explanatory diagrams for a description of the relationship between a swirl air stream and a fuel spray in this invention.

In general, in an injection nozzle used in a small, high speed diesel engine, the ignition delay time of fuel spray is of the order of 1 msec. Accordingly, it is essential that the distance traveled by the spray is shorter than the distance between the injection hole of the injection nozzle and the wall of the combustion chamber. In a small, high speed diesel engine having cylinders 100 mm or less in diameter, to which the technical concept of the invention is applicable, in general the combustion chamber C is a semi-spherical recess formed in the piston P as shown in FIG. 2. Where the combustion chamber C is formed in the cylinder whose diameter is limited as described above, the distance L between the injection hole N of the fuel injection nozzle V and the wall of the combustion chamber is no more than 30 mm. On the other hand, in the case of a hole injection nozzle which is extensively employed as a diesel engine fuel injection nozzle, the distance traveled by the spray changes with time as shown in FIG. 3. As is apparent from FIG. 3, the spray travels more than 40 mm for 1 msec after the start of injection, which corresponds to the aforementioned ignition delay time. The distance traveled by the spray is longer than 30 mm. Accordingly, the spray strikes the wall of the combustion chamber C. Thus, it is difficult for the conventional method to prevent the spray from being struck against the combustion chamber wall thereby to satisfactorily burn the spray in the high temperature air as intended by the invention.

Figure 5:
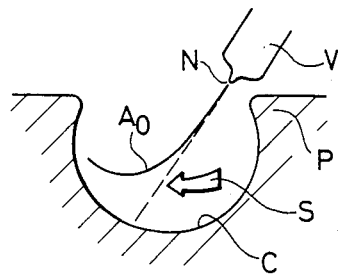
Figure 6:
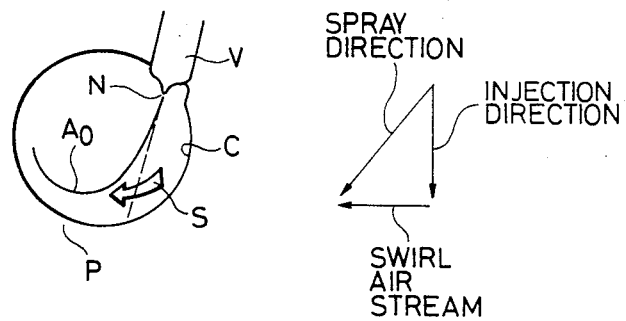

On the other hand, if a strong swirl air stream is formed in the combustion chamber to bend the course of the spray, the striking of the spray against the combustion chamber wall may be prevented. That is, for instance, in the case of the aforementioned hole injection nozzle, a strong swirl stream of sucked air S is caused to laterally act on the fuel spray $A_0$ of the fuel injection nozzle V, to turn the course of the spray, thereby to prevent the spray from sticking against the wall of the combustion chamber C. The degree of turning the direction of the spray by the strong swirl air stream S is shown in FIGS. 5 and 6 in more detail. The spray speed and the speed of the swirl air stream are as shown in FIG. 5 when considered in a vectorial sense. In order to cause the fuel spray $A_0$ to flow along the wall of the combustion chamber C (without striking against the wall), it is essential that the spray speed is substantially equal to that of the swirl air stream. According to the measurement done with the hole injection nozzle, the spray speed is about 40 m/s. Therefore, the speed of the swirl air stream should be of the order of 40 m/s.

Figure 7:
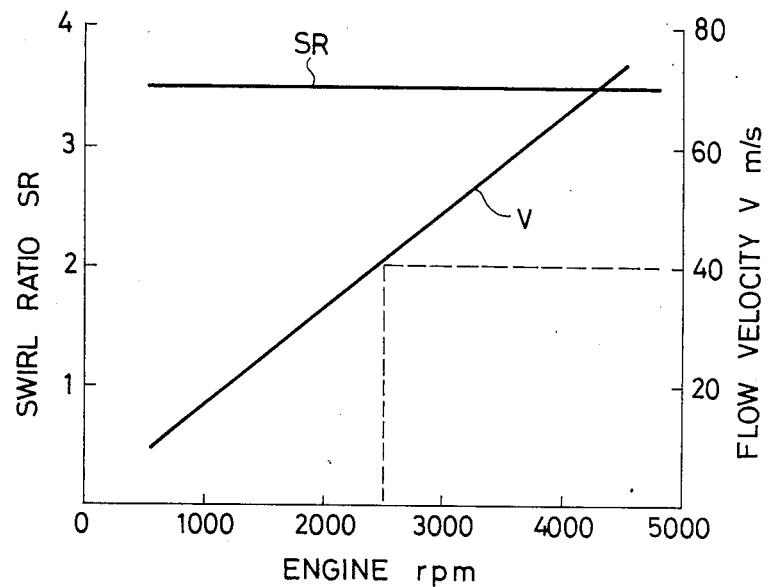
FIG. 7 is a graphical representation indicating engine speeds versus swirl ratios.

The speed of the swirl air stream in the combustion chamber is expressed by a so-called "swirl ratio". The swirl ratio is expressed with respect to the engine speed (rpm), and therefore the engine speed, the swirl ratio and the actual flow velocity are as shown in FIG. 7. The swirl ratio is constant independently of the engine speed, and the actual flow velocity increases in proportion to the engine speed. In general, as the swirl ratio increases, the suction resistance is increased, and especially the quantity of sucked air is decreased in the range of high speed rotation, so that the output of the engine is decreased. Therefore, in a practical engine, the swirl ratio is set to about 3.5. FIG. 7 shows swirl velocities with the swirl ratio set to 3.5. In FIG. 7, with the speed 40 m/s of the spray from the hole injection nozzle, in the range of speed higher than 2500 rpm the swirl velocity is higher than 40 m/s, so that the striking of the spray against the wall of the combustion chamber can be prevented; however, in the range of speed lower than 2500 rpm it is impossible to obtain a flow velocity high enough to turn the direction of the spray.

Figure 8:
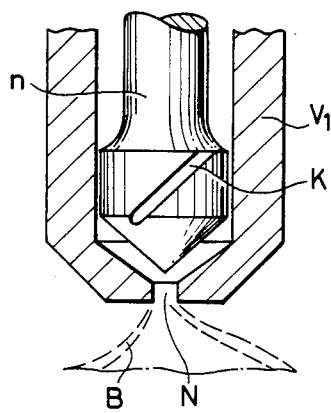
FIG. 8 is an explanatory diagram outlining the essential components of a swirl injection nozzle.
Figure 9:
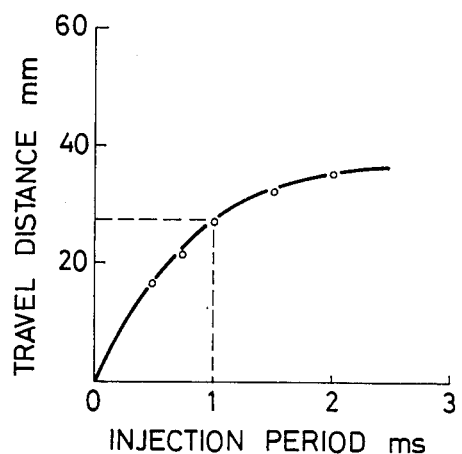
FIG. 9 is a graphical representation indicating injection periods versus spray travel distances, for a description of the operation of the nozzle in FIG. 8.

This difficulty can be eliminated by employing a swirl injection nozzle which has been proposed by the same inventors in a U.S. application Ser. No. 647,557 filed on Sept. 5, 1984. A typical example of the swirl injection nozzle is as shown in FIG. 8. The injection nozzle $V_1$ has inclined grooves K cut in the needle valve n. The fuel is formed into swirl fuel streams by obtaining the swirl speed component while flowing along the grooves K. The swirl fuel streams form a conical fuel film B when jetted from the injection port N. In this case, the initial speed of the jetted spray in the axial direction is small, so that the force of penetration of the spray is extremely small. Therefore, the spray travel distance is considerably short when compared with that of the hole injection nozzle, as shown in FIG. 9. The spray speed calculated by using FIG. 9 is 20 to 25 m/s. Therefore, with the swirl velocity shown in FIG. 7, even in the range of low engine speed the course of the spray can be sufficiently turned to prevent the spray from striking against the wall of the combustion chamber.

However, in this case, the following difficulty is involved. In the range of high engine speed, the speed of the swirl stream is considerably high. Therefore, if the force of penetration of the spray is small, the spray is excessively scattered. As a result, the range of combustible air-to-fuel ratio is decreased, and the combustion may be stopped. In order to overcome this difficulty, it is necessary that, in the range of high engine speed, the spray whose force of penetration conforms to the high speed of the swirl air stream is used to prevent the spray from being excessively scattered. Accordingly, in order to practice the mixture gas forming method of the invention in the wide range of engine speed, it is necessary to control the force of penetration of the spray according to the speed of the swirl air stream which changes with the engine speed.

This will be described more concretely. As shown in the following table, the range of engine speed higher than 2500 rpm is referred to as "a high speed range", while the range of engine speed lower than 2500 rpm is referred to as "a low speed range", and a force of penetration of spray, a spray angle and an injection period are determined for each of the ranges.

TABLE

| Condition | Engine speed range | | |
|---|---|---|---|
| | Low speed range | Middle speed range | High speed range |
| Intake swirl speed | Low (10 to 20 m/sec) | Middle (20 to 40 m/sec) | High (higher than 40 m/sec) |
| Spray penetration force (travel distance) | Small | Middle | Large |
| Spray angle | Large (75 to 30°) | Middle (50 to 20°) | Small (20 to 10°) |
| Injection period | Long (2 to 3 | Middle (1 to 2 msec) | Short (0.5 to 1 |

TABLE-continued

| | Engine speed range | | |
|---|---|---|---|
| Condition | Low speed range | Middle speed range | High speed range |
| | msec) | | msec) |

As is apparent from the above table, in the low speed range, the penetration force is small and the spray angle is large, and therefore, although the speed of the swirl air stream is not so high, the spray is caused to flow by the air stream, as a result of which the spray will not strike the wall of the combustion chamber and the combustion occurs quickly in the high temperature air. In this range, the injection period is long. Therefore, the mixture period and the combustion period can be long enough, and the combustion efficiency can be sufficiently increased. Accordingly, the amounts of harmful discharge components such as for instance soot which are formed during combustion can be decreased.

In the high speed range, the spray angle is small and the penetration force of spray is large. Therefore, even if the speed of the swirl air stream in the combustion chamber is increased, the spray will not excessively scattered; that is, the spray spreads fully in the combustion chamber, thus forming a suitable mixture gas. As a result, the combustion is carried out satisfactorily. In the high speed range, the injection period is set short. Therefore, the delay of injection of fuel can be eliminated, with the result that the engine output is increased.

On the other hand, in an intermittent type swirl injection nozzle according to the invention, the area of the opening which is formed at the position near the tangential passage, where the needle valve is slidably engaged with the valve hole is increased or decreased with the amount of lift of the needle valve, so that satisfactory fuel spray characteristics such as spray angle, flow rate, travel distance and atomization characteristics can be obtained in conformance with the operating conditions of the internal combustion engine. Accordingly, the fuel spray jetted substantially conically by the intermittent type swirl injection nozzle of the invention will not strike the wall of the recess in the combustion chamber or will not stick onto the upper surface of the piston; that is, the spray forms a satisfactory mixture gas with the aid of the intake air stream. The penetration force of the spray is held sufficiently, and therefore the fine fuel droplets travel in the combustion chamber until the combustion ends. Accordingly, the fuel spray is effectively burnt, as a result of which the engine output is increased, while the fuel consumption is decreased, and the problem of smoke generation can be solved. Furthermore, the quantities of hazardous components in the exhaust gas can be decreased, and the combustion noise can be considerably decreased.

Figure 10:
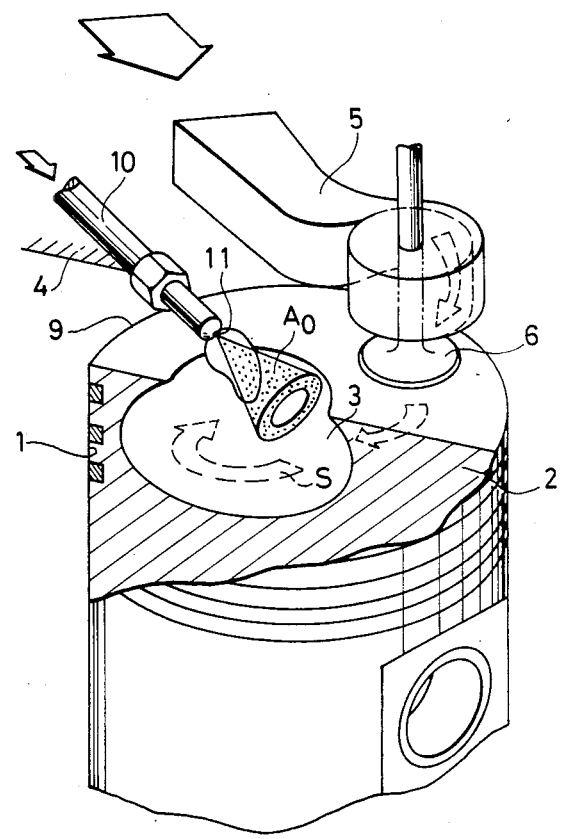
FIGS. 10 and 11 are diagrams showing a first embodiment of the invention.

A device for practicing the mixture gas forming method of the invention will be described with reference to its first example shown in FIGS. 10, 11 and 12.

In the first example, the direct injection type internal combustion engine is a diesel engine. A substantially spherical recess 3 as a combustion space is formed in the top of a piston 2 slidably fitted in a cylinder 1 in such a manner that the recess 3 is located away from the central axis of the piston. A cylinder head 4 having an intake passage 5 with a swirl mechanism such as a helical port or tangential port for swirling the sucked air and an exhaust passage (not shown) is mounted on the open top of the cylinder 1. The intake opening of the intake passage 5, which has an intake valve 6, and the exhaust opening of the exhaust passage (not shown) are so arranged as to confront the top of the piston 2. The cylinder 1, the piston 2 and the cylinder head 4 form a combustion chamber 9. A swirl injector 10 is secured to the cylinder head 4 in such a manner that its injection hole 11 is in the the opening of the recess 3 which is a part of the combustion chamber 9 and the axis of injection is obliquely extended without crossing the central axis of the recess 3. Accordingly, the sucked air flowing into the combustion chamber 9 through the intake passage 5 adapted to form a swirl air stream swirls in the recess 3, and the swirl injector 10 inclined in the direction of swirl of the main stream of the intake swirl S in the recess jets fuel substantially in the form of a hollow, conical swirling spray to the main stream of the intake swirl.

Figure 11:
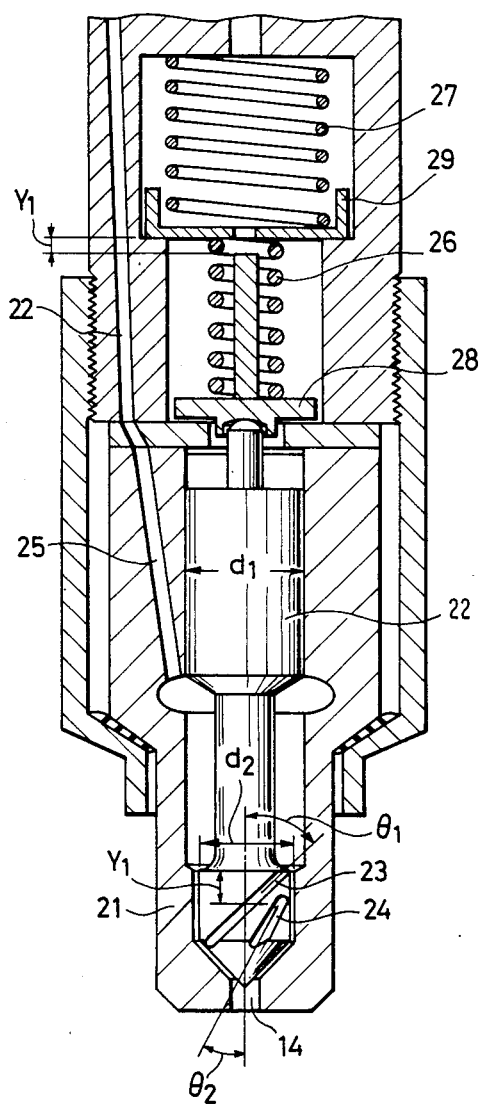

FIG. 11 shows one example of an injection nozzle means in the first embodiment of the invention, whose spray characteristic changes with the amount of lift of the needle valve 22, in order to practice the method of the invention.

The injection nozzle means comprises a swirl injection nozzle 21 having double slits, and a nozzle holder having two springs. The injection nozzle has a first slit 23 which forms a relatively large angle $\theta_1$ with respect to the central axis of the needle and is relatively small in groove width, and a second slit 24 which forms a relatively small angle $\theta_2$ with respect to the central axis of the needle and is relatively large in groove width. The second slit 24 is extended from the position which is at a distance $y_1$ from the entrance of the first slit 23 as shown in FIG. 11. The fuel supplied through a passage 22', 25 is delivered to the end portion of the needle through the first slit 23, to thus lift the needle against the elastic force of a first spring 26. The spring constant of the first spring is set to a small value. Therefore, even in the case where the engine speed (the injection pump speed) is low, so that the fuel supplying rate (per hour) is small and the fuel pressure is not high, the needle is lifted quickly. As the needle is lifted, a first pressure plate 28 is also raised, thus stricking a second pressure plate 29. The amount of lift in this operation is set smaller than the aforementioned distance $y_1$. A second spring 27 is set on the second pressure plate 29, and its spring constant is large. Therefore, in the case where the fuel pressure is low, the needle lifting operation is suppressed when the first pressure plate strikes the second pressure plate. During this operation, the fuel flows through the first slit 23, thus being swirled sufficiently thereby.

As the engine speed (the injection pump speed) is increased, the fuel supplying rate (per hour) is increased and the pressure in the nozzle is also increased. As a result, the needle is further raised against the elastic force of the second pressure plate 27, so that the second slit 24 is opened and the fuel flows through the second slit 24 thus opened. The inclination angle of the slit 24 is small and the groove width is large, as described before. Therefore, the fuel flowing through the slit 24 is not so swirled; that is, the fuel is jetted as if it were jetted by a hole injection nozzle instead of a swirl injector.

Figure 12:
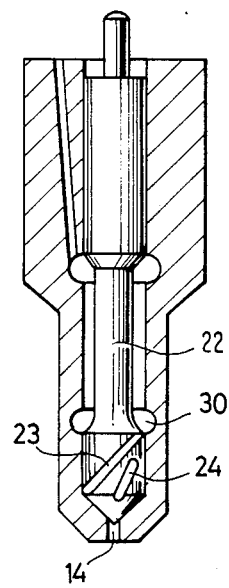
FIG. 12 is a diagram showing one modification of a swirl injection nozzle in FIG. 11.
Figure 16:
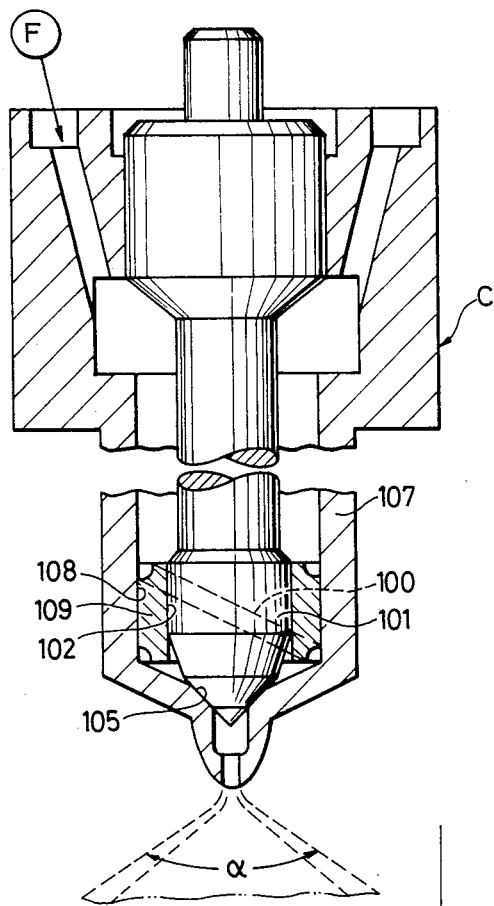
Figure 17:
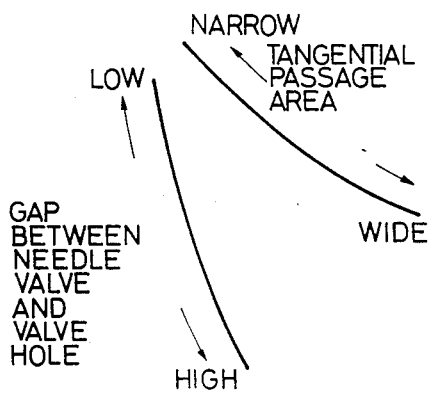
FIG. 17 is a graphical representation indicating the characteristic of the swirl injection nozzle which is affected by some structural factors thereof.

FIG. 12 shows one modification of the nozzle in FIG. 11. In the nozzle in FIG. 11, the body has different inside diameters ($d_1 > d_2$). On the other hand, in the modification, the different inside diameters are eliminated by forming a recess 30 in the body. The nozzle can be readily manufactured when compared with that in FIG. 11.

As is apparent from the above description, when the engine speed (the injection pump speed) is low, the swirl injector functions significantly so that the force of penetration is small, and therefore the spray will not stick on the wall of the combustion chamber even if the speed of the air stream in the combustion chamber is low. when the engine speed is high, the force of penetration becomes large similarly as in the case of the hole injection nozzle. As a result, the fuel spray speed becomes a value conforming to the intake swirl speed, and accordingly the spray is prevented from being excessively scattered. Thus, combustion is carried out stably.

In the injection nozzle which is the most essential element for practicing the method of the invention, unlike a hole injection nozzle generally used in a direct fuel injection type internal combustion engine, the nozzle outlet part is suitably designed so that, when the nozzle lift is low, the fuel is jetted in the form of a considerably thin film from the injection port, the initial injection speed of fuel is decreased, the fuel is satisfactorily atomized into fine fuel droplets, the spray angle is large, and the spray travel distance is short.

FIG. 13 shows the second embodiment of the invention, i.e., one application of the swirl injection nozzle of FIG. 8. In the application, inclined grooves 23 are cut in the end portion of the nozzle needle $n_2$. With the aid of the inclined grooves 23, the fuel obtains a swirl speed component, thus swirling at the nozzle outlet part at high speed. As a result, the fuel is jetted in the form of a considerably thin, conical film D from the injection port N. Therefore, the initial injection speed of the fuel is small, the spray angle is large, and the spray travel distance is short. These effects have been confirmed by the inventors.

Figure 18:
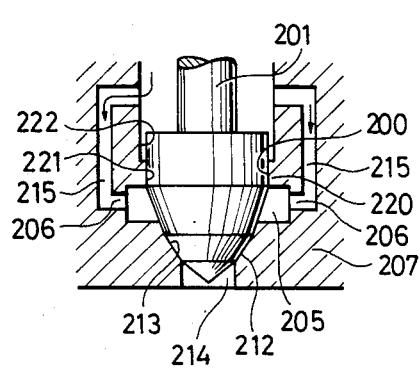
FIGS. 18 through 21 are diagrams for intermittent type swirl injection nozzles in third, fourth and fifth embodiments of the invention.

An intermittent swirl injector, in a third embodiment of the invention, is as shown in FIG. 18. A needle valve 201 is slidably fitted in a valve hole 200 cut in the end face of a nozzle body 207. A spiral spring is elastically engaged with the base end face of the needle valve. A conical seat 213 is formed in the end portion of the valve hole 200 so that the conical end portion 212 of the needle valve 201 is brought into contact with the valve seat 213. Furthermore, an injection hole 214 is extended from the conical valve seal 213 in such a manner that it opens in the end face of the nozzle body 207. A circular swirl chamber 205 is formed in the nozzle body 207 in such a manner that it is provided along the boundary between the cylindrical body and the conical end portion 212 of the needle valve 201. Tangential ports 206, which are tangential passages extended along the tangential directions of the outer wall of the swirl chamber 205, are formed between the outer wall of the swirl chambers and the ends of supply passages 215 formed in the nozzle body 207.

Fuel is supplied through the supply passages 215 and the tangential ports 206 into the swirl chamber 205. As the pressure of the fuel thus supplied is increased, the needle valve 201 is disengaged from the valve seat 213 in the valve hole 200 against the elastic force of the spiral spring, as a result of which a gap is formed between the end portion 212 of the needle valve 201 and the valve seat 213 to communicate the swirl chamber 205 with the injection hole 214. The supply passages 215, the tangential ports 206, the swirl chamber 205, and the gap between the end portion 212 of the needle valve 201 and the valve seat 213 of the valve hole 200 form a passageway which supplies fuel in swirl or spiral form to the injection port 214 when the valve is opened.

The above-described intermittent swirl injection nozzle has a gap 221 near the tangential ports 206 and at the part 220 of the nozzle body where the needle valve 201 is slidably fitted in the valve hole 200. The gap 221 has an annular passage 222 which is larger than the gap. That is, the swirl injection nozzle is so designed that the flow rate of fuel which flows to the injection hole 214 through the gap 221 without swirling is changed with the lift S of the needle valve 201.

In the above-described intermittent swirl injection nozzle, the spray angle can be obtained as desired in conformance to the operating condition of the internal combustion engine.

Figure 19:
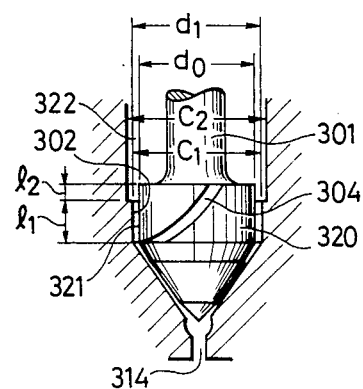

As is apparent from the above description, the swirl injection nozzle, which is the third embodiment of the invention, is of port type that the tangential passages formed in the nozzle body 207 are used to swirl the fuel. On the other hand, an intermittent type swirl injection nozzle which is a fourth embodiment of the invention is of screw type that, as shown in FIG. 19, tangential grooves 304 cut in the needle valve 301 are used to swirl the fuel. The fourth embodiment is the same or substantially the same as the third embodiment in the other points.

The swirl injection nozzle in FIG. 19 in a fourth embodiment of the invention is so designed that the flow rate of the fuel which flows into the injection hole directly (without swirling) through the gap 321 ($C_1$ and $C_2$) between the portion 320 (outside diameter $d_0$) of the needle valve 301 where the tangential grooves 304 are formed and the valve hole 302 (inside diameter $d_1$) changes with the lift S of the needle valve 301.

Figure 20:
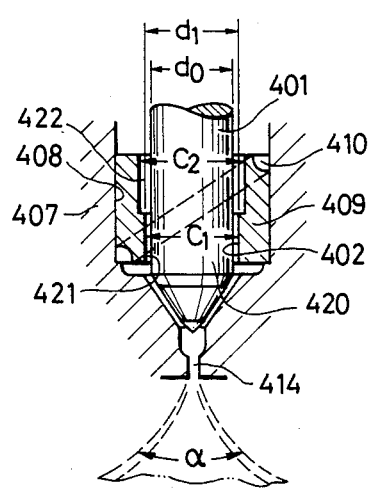

FIG. 20 shows an intermittent swirl injection nozzle in a fifth embodiment of the invention. The fifth embodiment is substantially the same as the above-described embodiment except that a partition member 409 is provided between the inner wall 408 of a nozzle body 407 and a needle valve 401, tangential grooves 410 are formed in the outer wall of the partition member 409, and the inner wall of the partition member forms a valve hole 402 in which the needle valve 401 is slidably fitted. The fifth embodiment of the invention is substantially the same as the fourth embodiment in the other points.

In the swirl injection nozzle in FIG. 20, as the needle valve 401 is lifted, the flow rate of the fuel which flows through the gap 421 without swirling is increased and the spray angle ($\alpha$) is gradully decreased.

Figure 21:
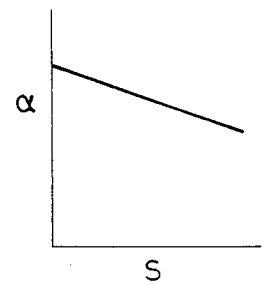

In the above-described embodiments, the relationship between the lift (S) of the needle valve and the spray angle ($\alpha$) is as indicated in FIG. 21.

The invention is not limited to the above-described embodiments; that is, various changes and modifications may be made as described below. In the following various modifications, those components which have been previously described are designated by the same reference numerals or characters and their detailed descriptions are omitted.

Figure 22:
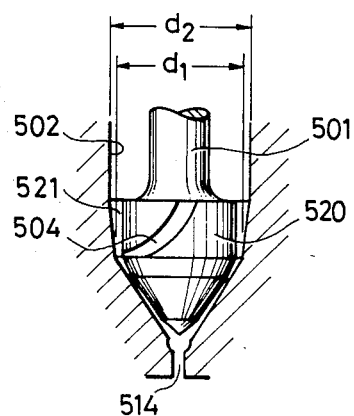
FIGS. 22 through 36 are diagrams for a variety of modifications of the swirl injection nozzles.
Figure 23:
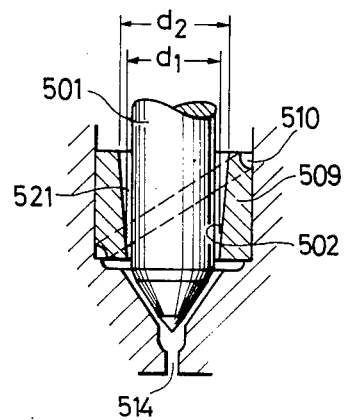
Figure 24:
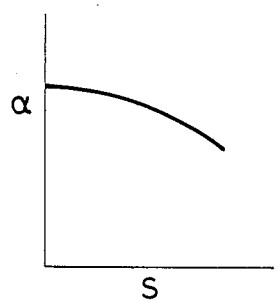

In a swirl injection nozzle shown in FIG. 22, the inside diameter of a part of a valve hole 502, which is brought into contact with a part 520 of a needle valve 501, changes gradually from $d_1$ to $d_2$ like a taper. In a swirl injection nozzle shown in FIG. 23, the inside diameter 509 changes hole 502 defined by a fixed partition member 509 changes gradually from $d_1$ to $d_2$ like a taper. In each of the swirl injection nozzles in FIGS. 22 and 23, as the needle valve 501 is lifted (S), the gap 521 is gradually increased and the flow rate of the fuel which flows through the gap is increased, and therefore the spray angle ($\alpha$) is gradually decreased as indicated in FIG. 24.

Figure 25:
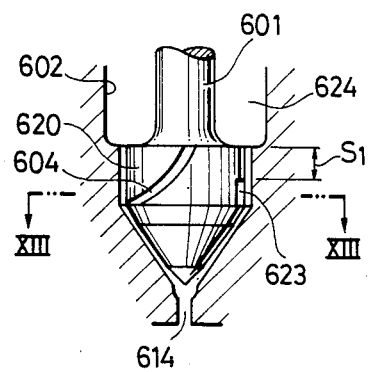
Figure 26:
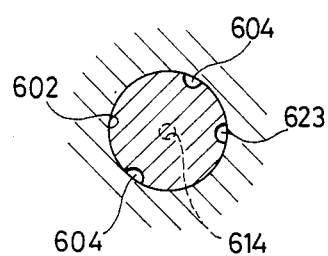

A swirl injection nozzle shown in FIGS. 25 and 26 is so designed that a relief groove 623 in addition to tangential grooves 604 are formed in the outer wall of the needle valve 601. The relief groove 623 is communicated with an injection hole 614. When the lift of the needle valve 601 reaches $S_1$, the relief groove is communicated with a fuel passage 624, so that the fuel flows through the relief groove 623. The relief groove 623 is not curved. Therefore, in this case, the fuel is not swirled, and the spray angle $\alpha$ becomes small.

Figure 27:
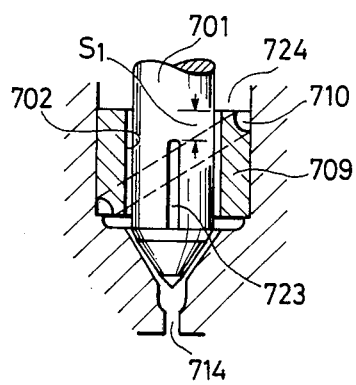
Figure 28:
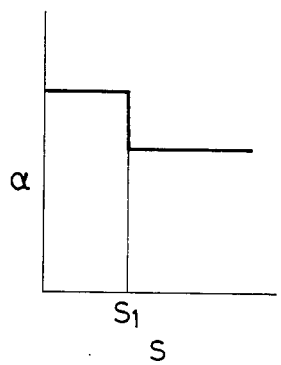

In a swirl injection nozzle shown in FIG. 27, the needle valve 701 has a relief groove 723 in its part confronting with a tangential groove 710 formed in a partition member 709. When the needle valve 701 is lifted as much as a value $S_1$, the relief groove 723 is communicated with a fuel passage 724. As a result, the fuel which passes through the relief groove 723 without being swirled meets the fuel which flows through the tangential groove 710 cut in the partition member 709 so as to be swirled, and therefore the spray angle $\alpha$ is small. In the cases of the swirl injection nozzles shown in FIGS. 25 through 27, the relationship between the lift S of the needle valve and the spray angle $\alpha$ is as indicated in FIG. 28.

Figure 29:
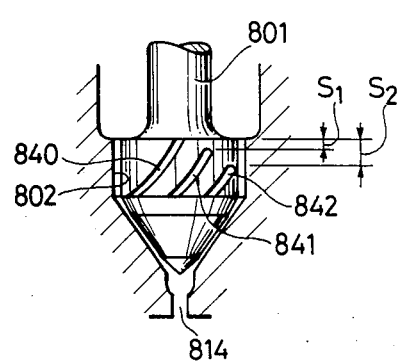

A swirl injection nozzle shown in FIG. 29 is so designed that the needle valve 801 has a tangential groove 840 and at least two tangential grooves 841 and 842 which are shorter than the tangential groove 840 and communicated with the injection hole 814. Therefore, the fuel flows through the tangential groove 840 during the initial period of the spraying operation, and it flows through the tangential groove 841 also when the needle valve 801 is lifted as much as a value $S_1$. Furthermore, the fuel flows through the tangential groove 842 also when the lift of the needle valve 801 reaches a value $S_2$. Accordingly, as the lift of the needle value reaches the value $S_1$ and the value $S_2$, the flow area of the tangential grooves which the fuel passes through is increased. As a result, the velocity of the fuel passing through the tangential groove is decreased, the swirl speed is decreased, and the spray angle $\alpha$ is also decreased.

Figure 30:
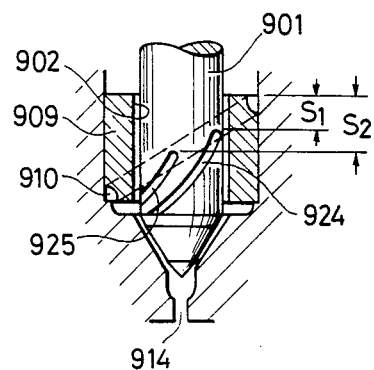

A swirl injection nozzle shown in FIG. 30 is so designed that the needle valve 901 has at least two swirl grooves 924 and 925 in its part confronting with a tangential groove 910 formed in a partition member 909. The swirl grooves 924 and 925 are shorter than the tangential groove 910 and communicated with the injection hole 914. Similarly as in the case of the swirl injection nozzle shown in FIG. 29, when the lift of the needle valve reaches a value $S_1$, the fuel flows through the swirl groove 924 also; and when the lift of the needle valve reaches a value $S_2$, the fuel flows through the swirl groove 925 also. Therefore, the velocity of the fuel passing through the swirl grooves is decreased and the spray angle $\alpha$ is also decreased.

Figure 31:
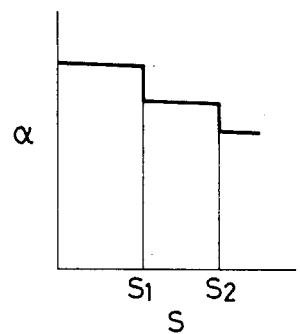

The relationships between the spray angle and the lift S of the needle valve 901 are as indicated in FIG. 31. It is not always necessary that the areas and the inclination angles of the at least two swirl grooves are the same as those of the above-described tangential grooves; however, the effect of the former is substantially equal to that of the latter.

Figure 32:
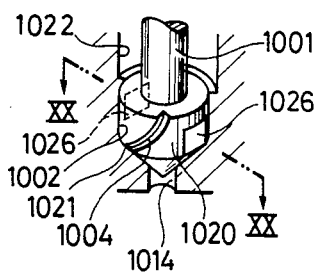
Figure 33:
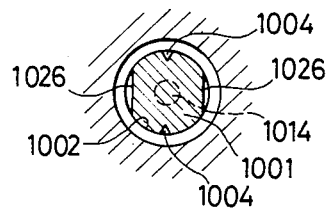
Figure 34:
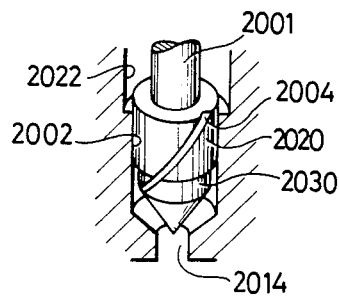

The adjustment of the nozzle gap area is not limited to those which have been described above. For instance, it may be achieved by forming flat surfaces 1026 in the part 1020 of the needle valve 1001, which is slidably fitted in the valve hole 1002 as shown in FIGS. 32 and 33, or by forming an annular step 2030 in the part 2020 of the needle valve 2001, which is slidably fitted in the valve hole 2002 as shown in FIG. 34.

According to the invention, the mixture gas is formed as described above. In an engine in which fuel is injected into the cylinders, such as for instance a small diesel engine, the fuel spray is jetted into the high-temperature air, which is obtained by adiabatic compression, without sticking onto the wall of the combustion chamber, thus being burnt quickly. Accordingly, a high combustion efficiency is obtained, while the range of operation of the engine is increased. Furthermore, the fuel comsumption is decreased, and the amounts of harmful exhaust components is decreased.

When the invention is applied to an automobile engine, great decrease of the fuel consumption and increase of the output can be expected.

When the invention is applied to a small, high-speed diesel engine, when compared with an auxiliary chamber type diesel engine which is extensively employed, the contraction loss of the auxiliary chamber is less and the pressure increasing rate is suitable. Therefore, the efficiency and the specific fuel consumption of the engine is improved.

In the above-described direct injection type diesel engine operated according to the M-combustion method, it is difficult to control the evaporation of fuel on the wall, and especially when the engine is started and the load is light, a large amount of harmful materials such as for instance soot are discharged. On the other hand, in the engine operating according to the mixture gas forming method of the invention, in all the range of operation the fuel injected into the high-temperature air is burnt quickly, and therefore the output is high, and the quantities of hazardous materials discharged are small. Thus, the effects of the mixture gas forming method of the invention should be highly appreciated in practical use.

As is apparent from the above description, in the swirl injection nozzle of the invention, in order to eliminate or decrease the swirl of the fuel the nozzle gap area near the tangential passage and at the part of the nozzle where the needle valve is slidably fitted in the valve hole is increased with the lift of the needle valve. As a lift of the needle valve is increased, the nozzle gap area is increased, so that the fuel is caused to flow through the nozzle gap whose area has been thus increased, as a result of which the swirl speed of the fuel is decreased and the spray angle $\alpha$ is also decreased. Thus, the swirl injection nozzle is suitable for the case where the fuel spray should have a large spray angle and a small penetration force when the internal combustion engine is operated at low speed, and the fuel spray should have a small spray angle and a large penetration force when the engine is operated at high speed.

Figure 35:
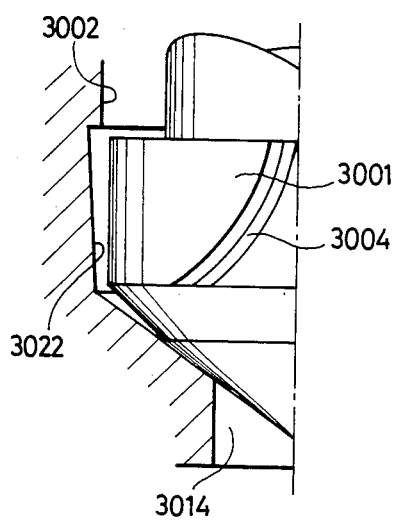
Figure 36:
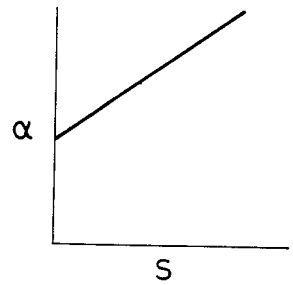

In the case where the fuel spray should have a relatively small spray angle and a large penetration force when an internal combustion engine with an auxiliary chamber, air chamber or swirl chamber is operated at low speed, and the fuel spray should have a relatively large spray angle and a small penetration force when it is operated at high speed, the intermittent swirl injector can be employed by modifying it in such a manner that the nozzle gap area near the tangential passage and at the part of the nozzle where the needle valve is slidably fitted in the valve hole is decreased with the lift of the needle valve. In the modification, as shown in FIGS. 35 and 36, as the lift of the needle valve 3001 is increased, the quantity of fuel passing through the nozzle gap 3022 is decreased, and accordingly the fuel is forced to flow through the tangential passage 3004. As a result, the swirl speed of the jetted fuel is increased, and the spray angle α is increased.

In the above-described embodiments, the valve hole or the needle valve increases or decreases the nozzle gap area at the part of the nozzle where the needle valve is slidably fitted in the valve hole, as the needle valve is lifted. However, the invention is not limited thereto or thereby. That is, the swirl injection nozzle may be so designed that the valve hole and the needle valve change the nozzle gap area as the needle valve is lifted.

We claim:

1. A mixture gas formation method for a direct fuel injection type internal combustion engine having a piston with a recess forming a combustion space, air intake means with swirling means for swirling intake air to be supplied to said combustion space, and an intermittent type swirl injection nozzle having at least one tangential passage for swirling fuel, for jetting fuel in substantially conical form through an injection hole thereof into said swirling intake air, to form a mixture gas, comprising the steps of:
   supplying swirling intake air into said combustion space, said swirling intake air having a swirl speed in conformance to the speed of said internal combustion engine, and
   spraying fuel from said swirl injection nozzle into said swirling intake air in said combustion space at a fuel spray angle, defined as the angle of said conical form, varied in response to said engine speed,
   thereby controlling the spray travel distance of said fuel and allowing said fuel to float in said combustion space substantially without adhering to a wall of said combustion space.

2. A method as claimed in claim 1, in which
   when said internal combustion engine is operated in a low speed range, said fuel is sprayed with a relatively large fuel spray angle, so as to travel a relatively short distance, and
   when said internal combustion engine is operated in a high speed range, said fuel is sprayed with a relatively small fuel spray angle, so as to travel a relatively long distance.

3. A method as claimed in claim 2, in which the swirl speed of said intake air is made substantially equal to the spray speed of said fuel, to allow said fuel spray to float in said combustion space.

4. A method as claimed in claim 2, in which, when said internal combustion engine is operated in said low speed range and the swirl speed of said intake air is not more than 40 m/sec, the fuel spray angle of said swirl injection nozzle is set to 20° to 75°, and when said internal combustion engine is operated in said high speed range and the swirl speed of said intake air is higher than 40 m/sec, the fuel spray angle of said swirl injection nozzle is set to 10° to 30°.

5. A method as claimed in claim 4, in which
   when said internal combustion engine is operated in said low speed range, the fuel injection period of said swirl injection nozzle is set to 2 to 3 msec, and when said internal combustion engine is operated in said high speed range, the fuel injection period of said swirl injection nozzle is set to 0.5 to 1 msec,
   thereby providing combustion periods in conformance to the engine speed.

6. A mixture gas forming device for a direct injection type internal combustion engine, which comprises:
   a piston with a recess forming a combustion space;
   air intake means having air swirling means, for supplying swirling intake air into said combustion space at a swirl speed in conformance to the speed of said internal combustion engine; and
   an intermittent swirl injection nozzle for spraying fuel into said swirling intake air in said combustion space at a fuel spray angle, defined as the angle of the substantially conical spray pattern defined by said fuel, varied in response to said engine speed, said intermittent swirl injection nozzle comprising:
   a valve body having a valve hole formed therein and a bottom portion with a valve seat and an injection hole;
   a needle valve slidably fitted in said valve hole, for opening and closing said injection hole;
   at least one tangential passage for swirling fuel to be supplied to said combustion space when said needle valve is lifted; and
   means for changing the area of a nozzle gap between said valve body and said needle valve to change the quantity of fuel to be supplied through said nozzle gap relative to the quantity of fuel to be supplied through said tangential passage in response to said engine speed, said nozzle gap being provided in at least one of said valve hole and said needle valve near said tangential passage and at a part where said needle valve is slidably fitted in said valve hole,
   thereby allowing said fuel to float in said combustion space substantially without adhering to a wall of said combustion space.

7. A device as claimed in claim 6, in which said means for changing the area of said nozzle gap comprises means for increasing the area of said nozzle gap to make the quantity of fuel flowing through said nozzle gap larger than that flowing through said tangential passage,
   whereby, the fuel spray angle of said swirl injection nozzle is made large during low speed operation of said engine to allow said fuel spray to travel a relatively short distance, the fuel spray angle of said swirl injection nozzle being made small during a high speed operation of said engine to allow said fuel spray to travel a relatively long distance.

8. A device as claimed in claim 6, in which said tangential passage is formed in the outer wall of said needle valve.

9. A device as claimed in claim 6, in which said tangential passage is formed inside said valve body.

10. A device as claimed in claim 6, in which a stationary partition member is provided between said valve body and the needle valve, and said tangential passage is formed between said member and said valve body.

11. A device as claimed in claim 7, in which said means for increasing the area of the nozzle gap is a recessed, annular passage provided in the inner wall of said valve body and extending in a direction opposite to the direction of said injection hole, said passage being larger in diameter than said valve hole, whereby the area of said nozzle gap is increased as said needle valve is lifted.

12. A device as claimed in claim 7, in which said valve hole is tapered towards said injection hole, so that said nozzle gap is increased as said needle valve is lifted.

13. A device as claimed in claim 7, in which said needle valve has a relief passage which is communicated with said injection hole at all times and is communicated with said valve hole as said needle valve is lifted, whereby said nozzle gap area is increased as said needle valve is lifted.

14. A device as claimed in claim 7, in which a plurality of tangential passages of different length are formed in said needle valve in such a manner that said tangential passages are communicated with said valve hole successively as said needle valve is lifted, whereby said nozzle gap area is increased as said needle valve is lifted.

15. A device as claimed in claim 6, wherein
said means for changing the area of said nozzle gap comprises means for decreasing the area of said nozzle gap to make the quantity of fuel flowing through said nozzle gap smaller than that flowing through said tangential passage,
whereby, the fuel spray angle of said swirl injection nozzle is made small during a low speed operation of said engine to allow said fuel spray to travel a relatively long distance, the fuel spray angle of said swirl injection nozzle being made large during a high speed operation of said engine to allow said fuel spray to travel a relatively small distance.

16. A device as claimed in claim 15, in which
said means for decreasing the area of the nozzle gap is a projected, annular passage provided on the inner wall of said valve body and extending in a direction opposite to the direction of said injection hole, said passage being smaller in diameter than said valve hole, whereby the area of said nozzle gap is increased as said needle valve is lifted.

* * * * *